(12) United States Patent
Davis

(10) Patent No.: US 7,344,344 B2
(45) Date of Patent: Mar. 18, 2008

(54) SYSTEM AND METHOD FOR LOADING OR MANEUVERING A BOAT ONTO A BOAT TRAILER

(76) Inventor: William E Davis, 15698 NC 125, Oak City, NC (US) 27857

( * ) Notice: Subject to any disclaimer, the term of this patent is extended or adjusted under 35 U.S.C. 154(b) by 207 days.

(21) Appl. No.: 11/250,923

(22) Filed: Oct. 14, 2005

(65) Prior Publication Data

US 2007/0086872 A1   Apr. 19, 2007

(51) Int. Cl.
*B60P 7/08* (2006.01)
(52) U.S. Cl. ............ 410/77; 410/2; 280/414.1
(58) Field of Classification Search ........... 410/77, 410/80, 81, 2, 3, 7, 69; 414/477–479, 491, 414/536; 280/414.1, 508; 114/44, 250, 114/344; 292/341.15, 341.16, 341.17, 334
See application file for complete search history.

(56) References Cited

U.S. PATENT DOCUMENTS

| | | | |
|---|---|---|---|
| 3,055,023 A | 9/1962 | McCord et al. | |
| 3,632,138 A | 1/1972 | Whitely, Jr. | |
| 3,712,488 A | 1/1973 | Steves | |
| 4,018,453 A | 4/1977 | Bigelow | |
| 4,114,920 A | 9/1978 | Boettcher | |
| 4,242,768 A | 1/1981 | Winsett | |
| 4,641,598 A | 2/1987 | Hodges | |
| 4,641,851 A | 2/1987 | Knies | |
| 4,934,302 A | 6/1990 | Harper | |
| 5,133,571 A | 7/1992 | Urbank | |
| RE35,372 E | 11/1996 | Houben et al. | |
| 5,666,901 A | 9/1997 | Jones | |
| 5,876,166 A * | 3/1999 | Hyslop | 410/77 |
| 6,402,445 B1 | 6/2002 | Smiley | |

* cited by examiner

*Primary Examiner*—Stephen Gordon
(74) *Attorney, Agent, or Firm*—Coats & Bennett, P.L.L.C.

(57) ABSTRACT

A boat loading system includes a powered extendable shaft mounted on a boat trailer and including a receiver mounted to a terminal end portion of the extendable shaft. A coupler or insert member is fixed to the bow of a boat and projects therefrom. To couple the receiver with the coupler, the extendable shaft is extended and the receiver aligned with the coupler. As the extendable shaft is extended, the coupler or insert member enters the receiver and engages a locking mechanism provided for therein. As the coupler or insert member is moved into the receiver, a locked condition is realized causing the coupler or insert member to be locked within the receiver. Thereafter, the powered extendable shaft is retracted and in the process, pulls the boat onto the trailer, positioning the boat in a loaded position on the trailer.

12 Claims, 12 Drawing Sheets

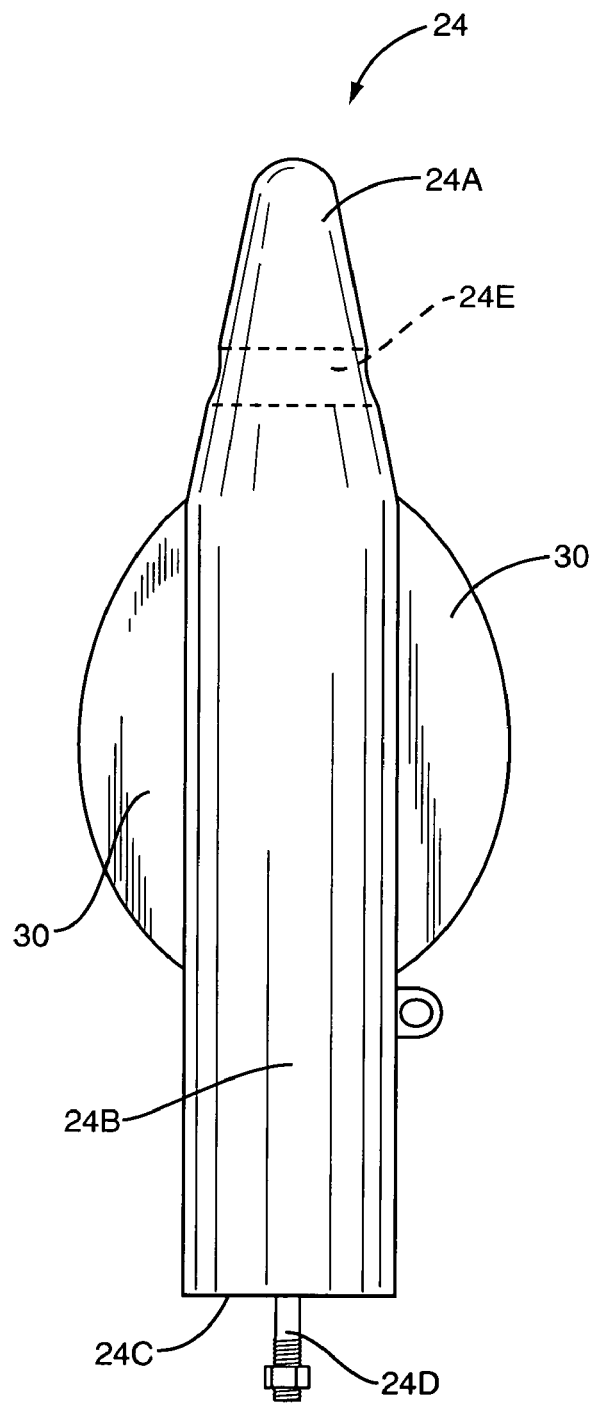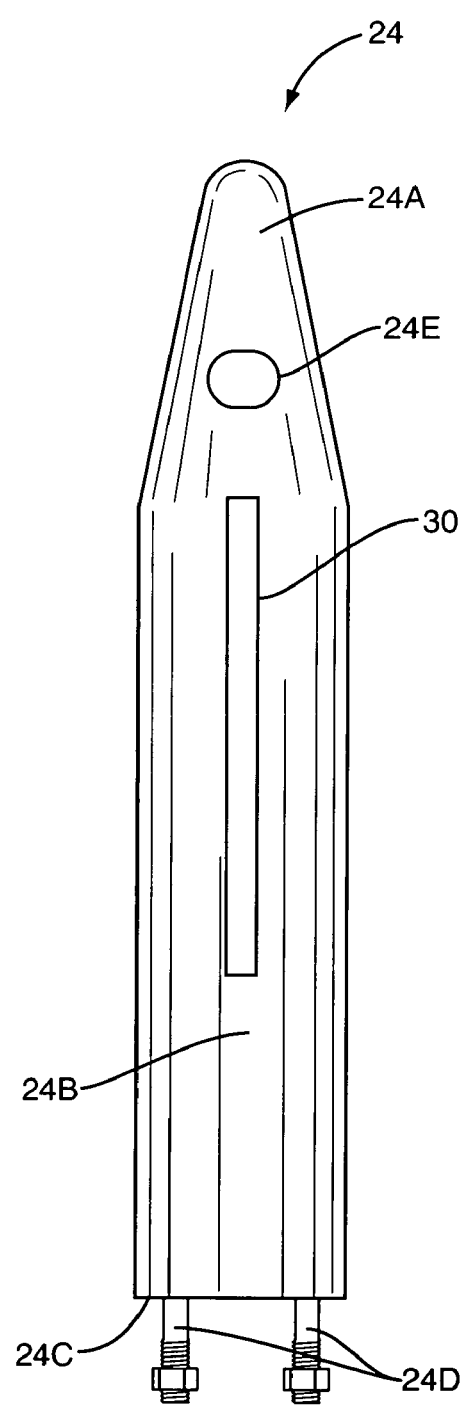
FIG. 5A   FIG. 5B

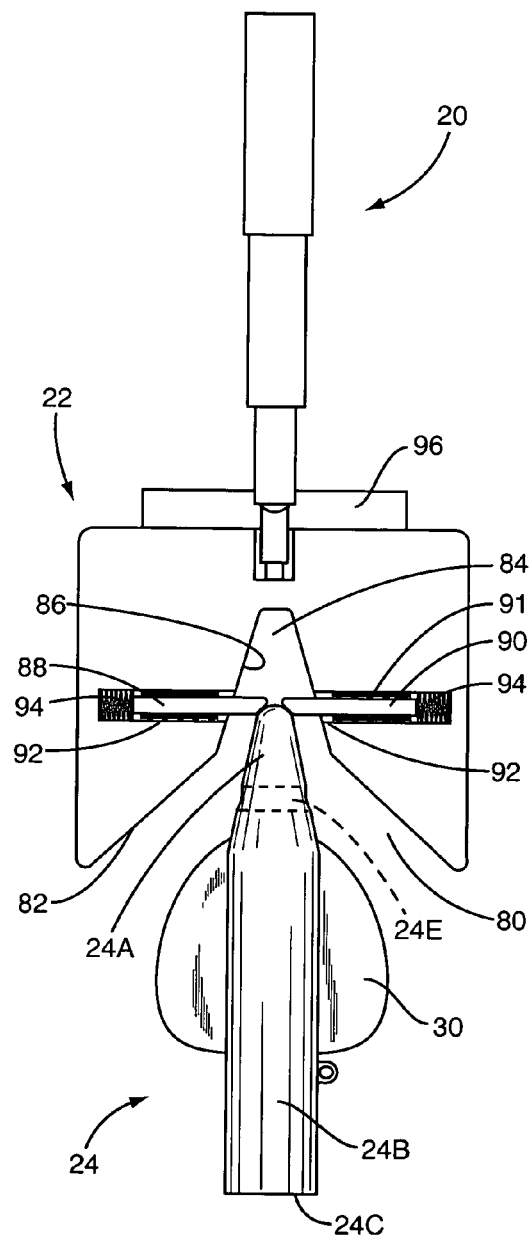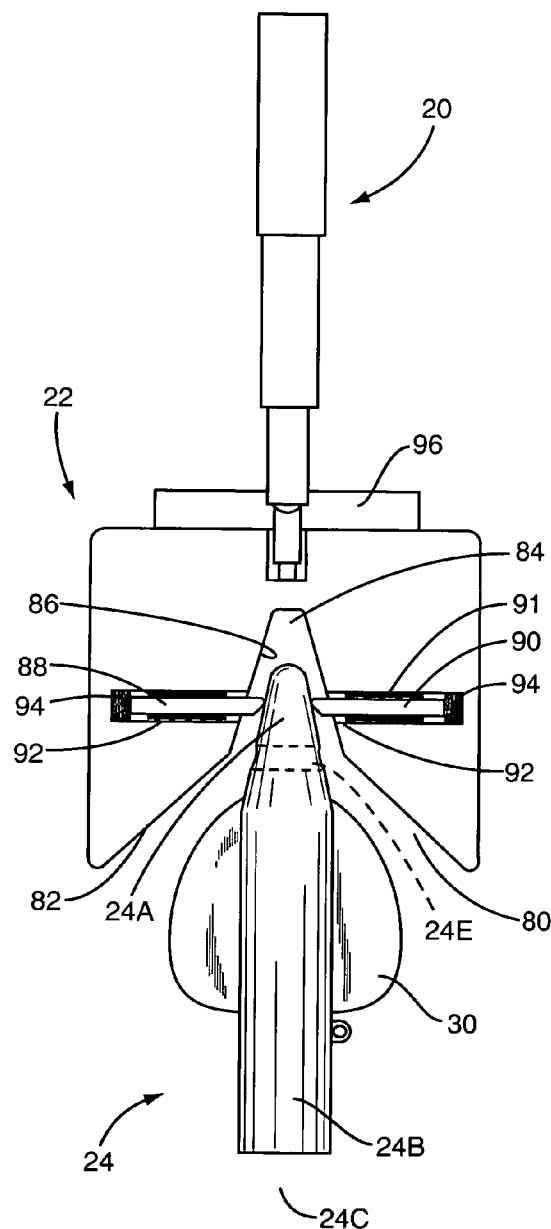
FIG. 6A          FIG. 6B

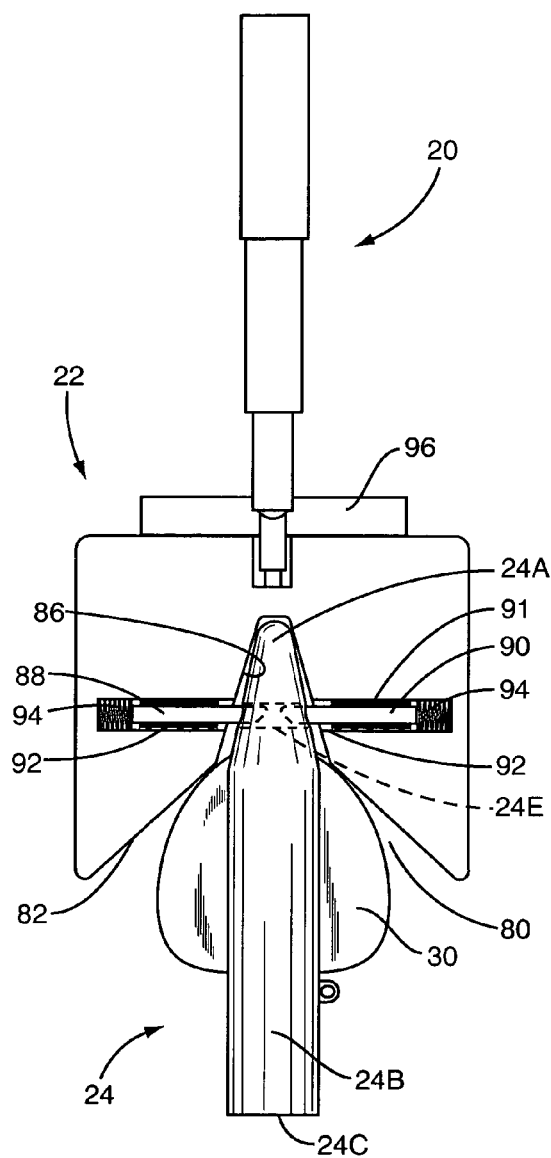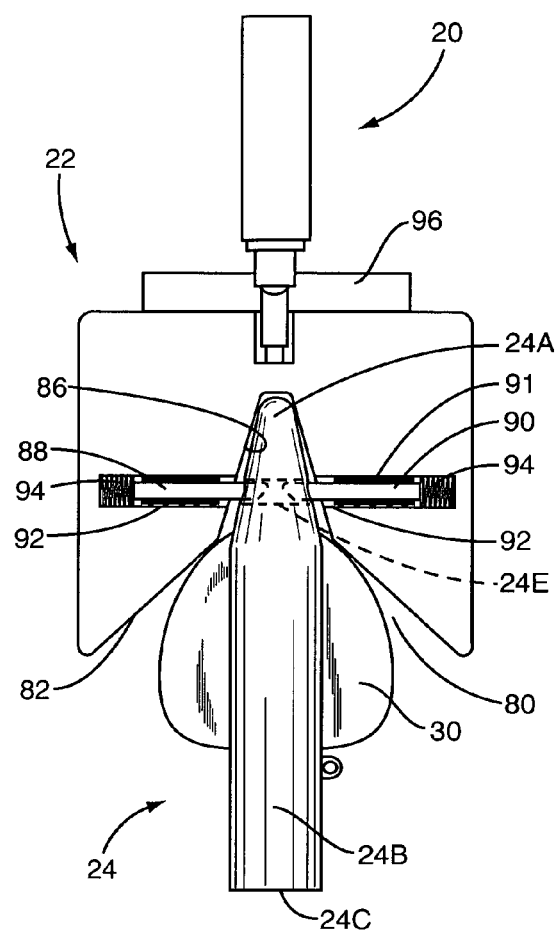
*FIG. 6C*  *FIG. 6D*

US 7,344,344 B2

SYSTEM AND METHOD FOR LOADING OR MANEUVERING A BOAT ONTO A BOAT TRAILER

FIELD OF THE INVENTION

The present invention relates to systems for loading boats onto boat trailers, and more particularly to a trailer mounted system that includes an extendable shaft that is adapted to be locked to a coupler or attaching member that projects from the boat.

BACKGROUND OF THE INVENTION

Conventional boat trailers are provided with a winch and cable assembly for retrieving and loading a boat onto a trailer. The cable is unwound from a reel and pulled to a position near the tail end of the boat trailer where the cable is attached to a clevis extending from the boat. Then the winch can be set such that as the winch is actuated and turned, the cable is wound around the reel and the boat is pulled onto the trailer and positioned in a transport position.

Utilizing a winch of a boat trailer can be a laborious and cumbersome job. This is particularly true for elderly people or people that have physical limitations. However, there is another major disadvantage to conventional boat trailer winch systems. Most often it requires an individual to stand in shallow water on the boat ramp while turning the winch.

Therefore, there has been and continues to be a need for a boat loading system that will enable one to automatically load a boat onto a trailer without having to stand in water located over the boat ramp in the vicinity of the trailer and winch.

SUMMARY OF THE INVENTION

The present invention entails a boat loading system that includes an extendable shaft that is mounted on or carried by boat trailer. The extendable shaft is operative to be extended and coupled to a connector associated with the boat. Once the connector has been coupled to the extendable shaft, the shaft is retracted which results in the boat being loaded onto the boat trailer.

In one particular embodiment, the boat-loading device includes an insert member adapted to be connected to the boat such that the insert member projects from the boat. An extendable shaft is provided and adapted to be secured to a boat trailer and movable between retracted and extended positions. A locking device is mounted to an outer end portion of the extendable shaft and adapted to receive the insert member which results in the insert member being locked within the locking device.

In one particular embodiment, the locking device includes at least two locking members movable between locked and unlocked positions. In the locked position the locking members engage and lock the insert member into the locking device.

In another embodiment, the present invention entails a boat-loading device for loading the boat onto a trailer that includes a receiver that is carried by the trailer or the boat. Further, a coupler is carried by the boat or the boat trailer. A powered extendable shaft carries either the coupler or the receiver and is operative to move the coupler and receiver into a relationship where they are locked together. When secured to a boat and a boat trailer and the receiver and coupler are connected, the boat-loading device extends between a portion of the boat trailer and a portion of the boat. The boat-loading device is operative to pull the boat onto the trailer in response to the extendable shaft being moved from the extended position to the retracted position.

Further, the present invention entails a method of loading or moving a boat onto a trailer wherein the boat is provided with a coupler or receiver and the trailer is provided with an extendable shaft having the coupler or receiver disposed on an outer end thereof. The method comprises extending the extendable shaft carried by the trailer and inserting the coupler within the receiver. Further the method entails locking the coupler and the receiver together and retracting the extendable shaft and pulling the boat with the retracting shaft so as to cause the boat to be positioned onto the trailer.

Other objects and advantages of the present invention will become apparent and obvious from a study of the following description and the accompanying drawings which are merely illustrative of such invention.

BRIEF DESCRIPTION OF THE DRAWINGS

FIG. 5A is a plan view of the coupler that forms a part of the boat loading system of the present invention.

FIG. 5B is a side elevational view of the coupler.

FIGS. 6A-6D are a sequence of views illustrating one embodiment of the boat loading system of the present invention.

DESCRIPTION OF EXEMPLARY EMBODIMENT

Figure 2A:
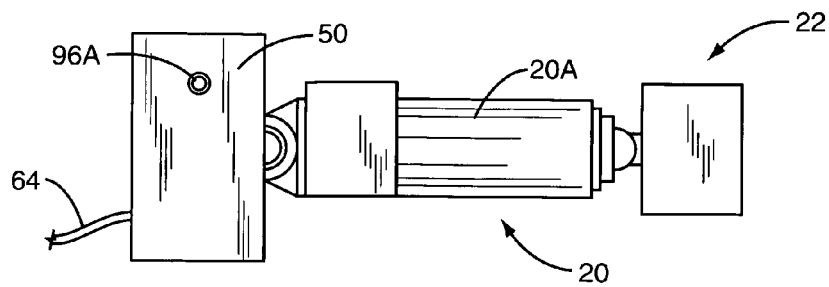
FIGS. 2A-2D are sequential views showing the extendable shaft of the boat loading system.
Figure 2B:
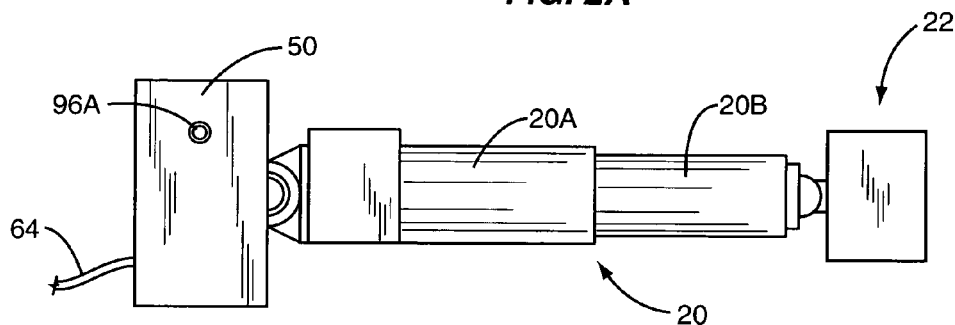
Figure 2C:
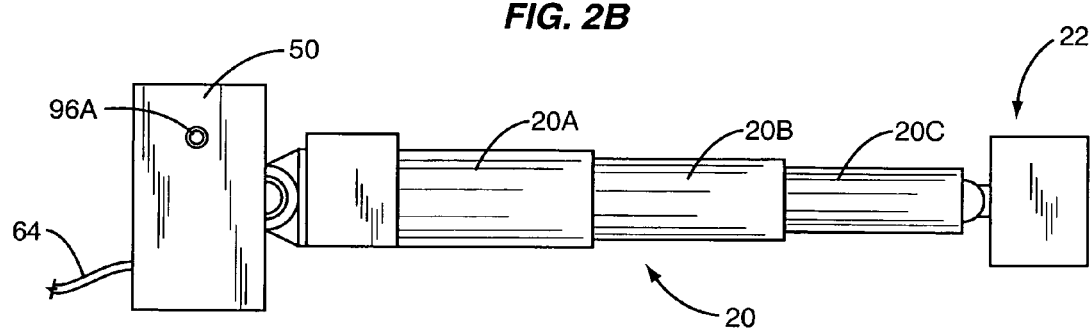
Figure 2D:
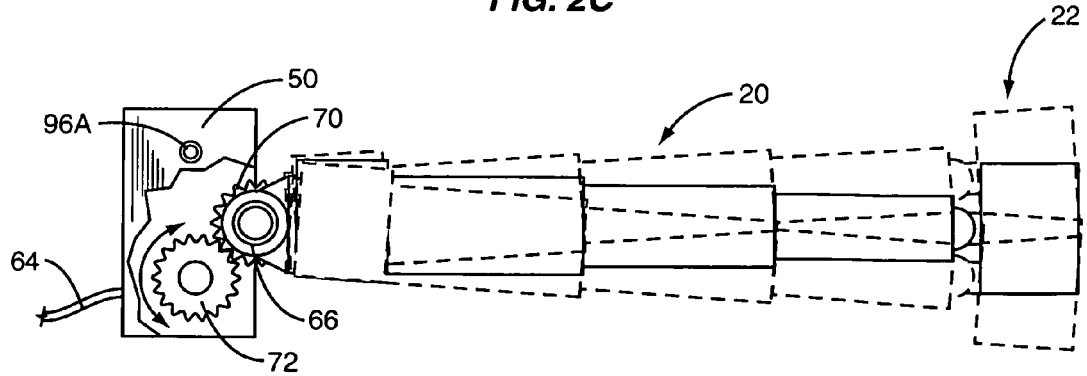
Figure 3:
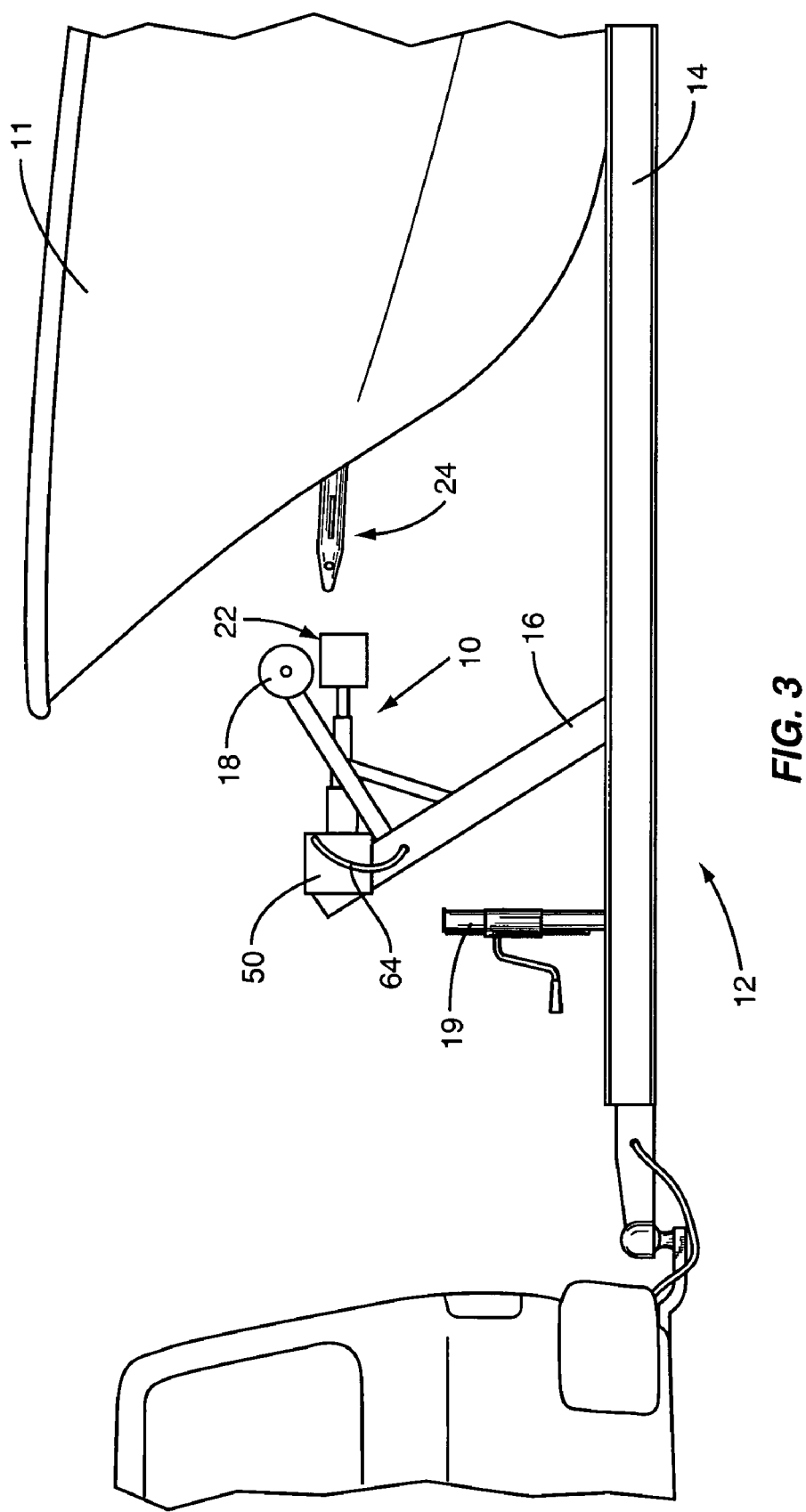
FIG. 3 is a side elevational view showing the boat loading system being utilized to load a boat onto a trailer.
Figure 4:
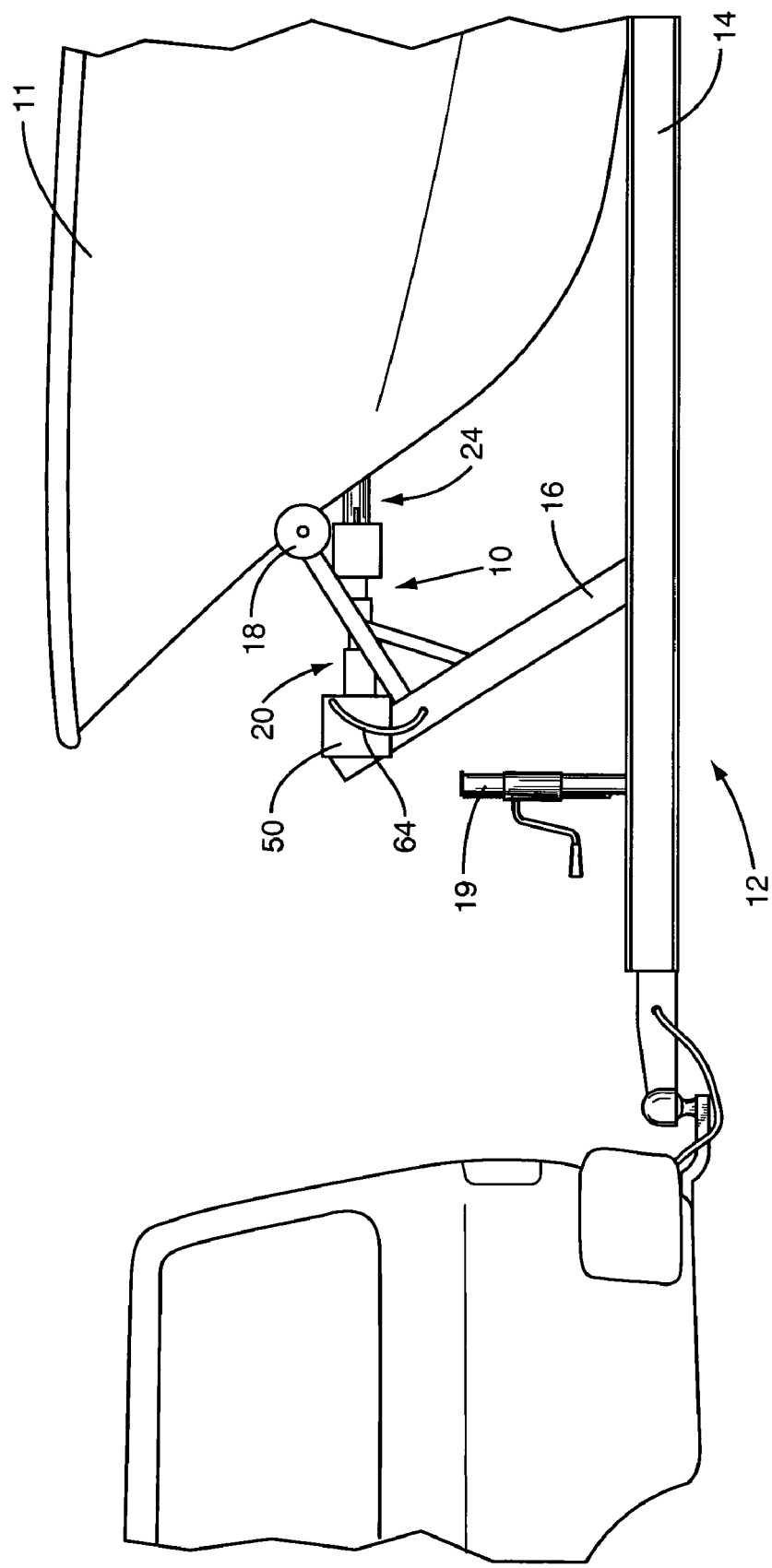
FIG. 4 is a view similar to FIG. 3 and shows the boat loading system 10 in a position where the boat has been loaded onto the trailer.

With further reference to the drawings, particularly FIGS. 1-4, the boat loading system of the present invention is shown therein and indicated generally by the numeral 10. As will be appreciated from subsequent portions of this disclosure, the boat loading system 10 is designed to load a boat 11 onto a boat trailer 12. Details of the boat 11 and boats trailer 12 are not per se material to the present invention, and therefore will not be discussed in any detail. However, as seen in the drawings, boat trailer 12 includes a mainframe 14 and a jack support 19 secured to the tongue or to a front portion of the boat trailer 12. An upright support structure 16 is fixed to the mainframe 14 of the boat trailer and extends upwardly therefrom as best seen in FIGS. 3 and 4. A stop 18 projects rearwardly from the front support 16 and is effective to limit the forward movement of the boat 11 on the boat trailer 12.

Turning now to a discussion of the boat loading system 10, the same includes an extendable shaft indicated generally by the numeral 20 and particularly shown in FIGS. 2A-2D. Extendable shaft 20 is movable between an extended position and a retracted position. In the extended position, the extendable shaft 20 is operative to connect to the boat 11. By retracting the extendable shaft 20, the boat 11 is pulled onto the boat trailer 12 and positioned in a transport position (FIG. 4).

Secured on the outer terminal end portion of the extendable shaft 20 is a receiver indicated generally by the numeral 22. Secured to the bow of the boat 11 is what is referred to as a coupler or connector, which is indicated generally by the numeral 24. Receiver 22 and coupler 24 are adapted to mate and couple with one another. In a coupled relationship, the extendable shaft 20, when retracted, is operative to pull or move the boat 11 onto the boat trailer 12. As used herein, the terms "receiver" and "coupler" are interchangeable. That is, the coupler 24 can be secured to the outer end portion of the extendable shaft 20, while the receiver 22 can be secured to the boat 11. Thus, the terms "receiver" and "coupler" mean two units that can be connected or disconnected for the purpose of moving the boat 11 with respect to boat trailer 12.

As discussed above, the boat loading system includes the extendable shaft 20. In the embodiment illustrated herein, the extendable shaft 20 includes a series of telescoping sections 20A, 20B and 20C. Telescoping sections 20A, 20B and 20C in the embodiment illustrated herein are powered by an electric motor disposed in housing 26. Details of the electric motor and the telescoping sections 20A, 20B and 20C are not shown here in detail because telescoping shafts powered by an electric motor through a gear or linkage arrangement is well known. It should be appreciated that the extendable shaft 20 can take on other forms. For example, the extendable shaft 20 may comprise a rod of a hydraulic or pneumatic cylinder that would be actuated between extended and retracted positions.

Extendable shaft 20 projects from a housing 50. Disposed within the housing 50 is a battery 52. The battery 52 is operative to power the electric motor that drives the extendable shaft 20. In addition, battery 52 provides power to a number of controls and indicators that are mounted on the housing 50. For example, disposed on the housing 50 is a number of indicator lights 56 and a charger indicator light 58. There is provided a power outlet 60 on the housing 50 and a control panel 62 that includes a series of switches. Extending from the housing 50 is an electrical connector 64 that would be operatively connected to the electrical system of a vehicle that is utilized to tow the boat trailer 12.

As will be discussed subsequently herein, receiver 22 includes a solenoid unit 96 for automatically actuating the receiver. To provide power to the solenoid unit 96, there is provided a wire 68 that extends from the housing 50 through the electric motor housing 26 and to the receiver 22.

Figure 1:
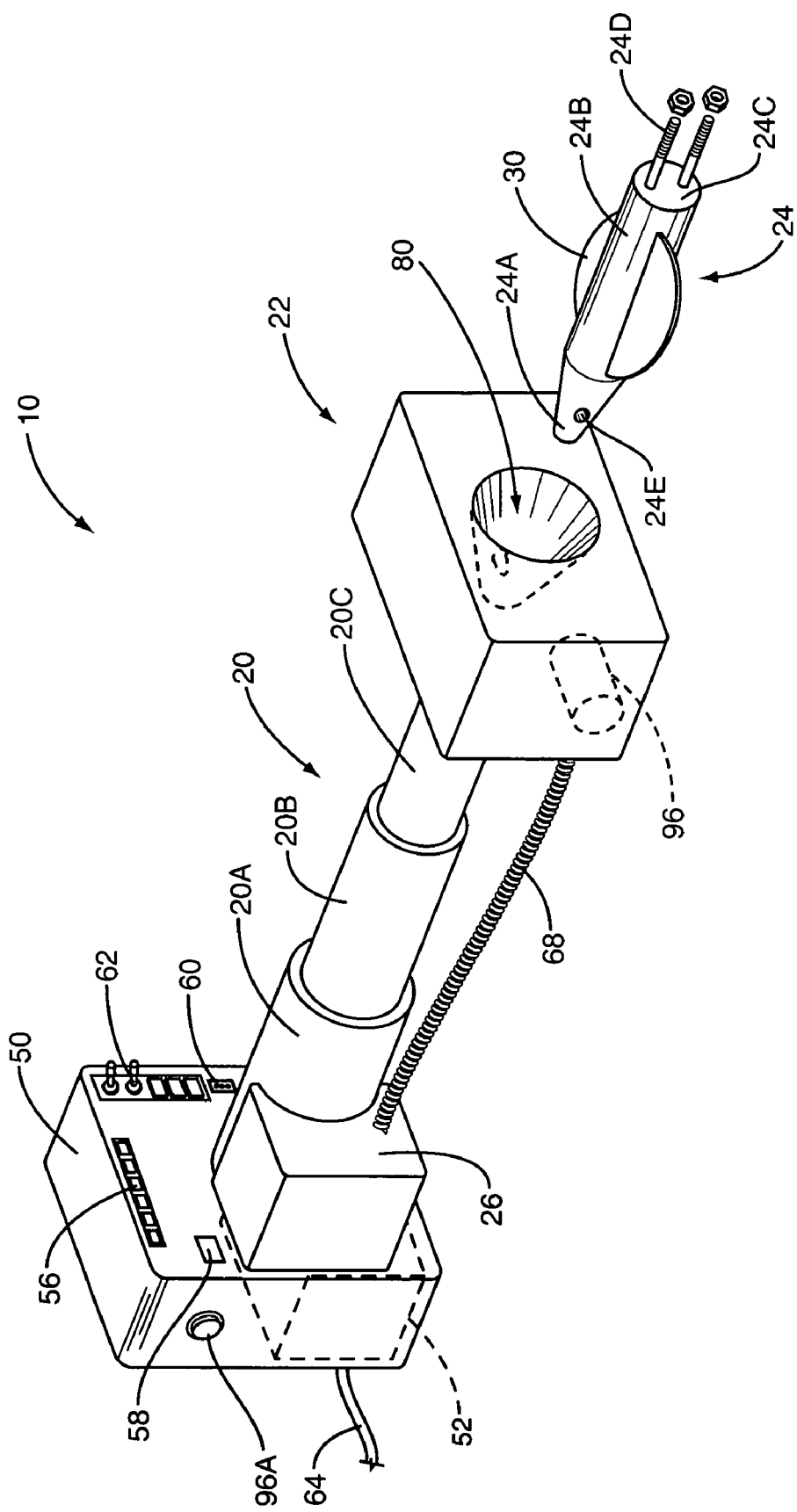
FIG. 1 is a perspective view of the boat loading system of the present invention.

The portion of the boat loading system 10 shown in FIG. 1, with the exception of the coupler 24, is mounted on the boat trailer 12. In particular, housing 50 is secured to front support 16 that projects upwardly from a front portion of the boat trailer 12. The entire unit including housing 50, extendable shaft 20, and receiver 22 is mounted in cantilever fashion to the front support 16 and projects rearwardly therefrom. To provide for flexibility in aligning the receiver 22 with the coupler 24, the extendable shaft 20 and its associated structure is mounted to a bearing assembly 66 such that the extendable shaft 20 and the receiver 22 can rotate or pivot about a transverse axis as illustrated in FIG. 2D. This will permit the extendable shaft, as indicated in FIG. 2D, to move up and down and thereby compensate for misalignment in the vertical direction. To drive the extendable shaft 20 upwardly and downwardly about the axis of the bearing assembly 66, there is provided a pair of gears 70 and 72. Gear 70 is operatively connected to a pivot shaft or pivot pin that forms a part of the bearing assembly 66. Meshed with gear 70 is a second gear 72 that is driven by a reversible electric motor (not shown). By selectively actuating the electric motor, the extendable shaft 20 can be raised and lowered. It will be appreciated by those skilled in the art that the extendable shaft 20 and its associated structure could be further mounted about a pivot assembly that would allow the extendable shaft to also pivot at least slightly from side to side. In addition, the entire extendable shaft 20 and its associated structure could be mounted on a pivot or spherical bearing that would allow the extendable shaft 20 to be rotated and articulated similar to a joystick.

To further facilitate the alignment of the receiver 22 with the coupler 24, the receiver 22 is movably mounted to the terminal end portion of the extendable shaft 20. In the case of the embodiment illustrated herein, receiver 22 is pivotally mounted about a generally horizontal or transverse axis. However, it is appreciated that the receiver 22 could be connected to the terminal end of the extendable shaft 20 such that the receiver 22 could pivot about multiple axes, or as discussed with respect to the mounting of the extendable shaft 20, the receiver 22 could be mounted on a pivot or spherical bearing.

Multiple embodiments of both the receiver 22 and coupler 24 are shown. For example, one embodiment for the receiver is shown in FIGS. 6A-6D, a second embodiment is shown in FIGS. 7A-7D, and a third embodiment shown in FIGS. 8A-8D. Before discussing the various embodiments for the receiver 22 it may be beneficial to discuss the basic structure of the coupler 24 as shown in FIGS. 5A and 5B.

Coupler 24 is sometimes referred to as a connector or insert member because in one embodiment the coupler 24 inserts into the receiver 22. In any event, coupler 24 is designed to be secured to the boat 11, and as shown in FIGS. 3 and 4, the coupler 24 projects from the bow of the boat 11. As seen in FIGS. 5A-5B the coupler 24 is elongated and includes a head 24A, a main body 24B, and a rear end 24C. Generally, the main body 24B assumes a cylindrical shape, and in the case of the particular embodiment shown in FIGS. 5A and 5B, the head 24A tapers inwardly to where the terminal end of the head is generally rounded. A transverse pin opening 24E extends through the coupler 24 in an area that lies generally between the head 24A and the main body 24B. One or more threaded bolts 24D projects from the rear wall 24C for attachment to the boat 11.

As discussed above, in one embodiment the coupler 24 is designed to be inserted into the receiver 22. In order to facilitate alignment such that the coupler 24 and receiver 22 can be properly connected and locked together, coupler 24 is provided with a pair of guide wings 30. Guide wings 30 in the embodiment illustrated herein are simply fin-like members that project outwardly from the main body 24. As will be appreciated from subsequent portions of this disclosure, guide wings 30 tend to "find" the opening of the receiver 22 and guide the coupler 24 into an opening of the receiver 22 such that the receiver and coupler can be securely locked together.

Returning to a discussion of the receiver 22, the first embodiment thereof is shown in FIGS. 6A-6D. Receiver 22 illustrated herein includes a housing structure that includes an outer conical opening 80 that, when installed on the boat trailer 12, projects rearwardly. Forming the outer conical opening 80 is a sidewall 82. Disposed interiorly of the outer conical opening 80 is an inner conical opening 84 having a conical sidewall 86. Note in FIG. 6A where the outer conical opening 80 is substantially wider, or assumes more area, than the inner conical opening 84.

Adjacent the inner conical opening 84 is a pair of locking pins 88 and 90. Locking pins 88 and 90 are movably mounted in slots 92 formed in the housing structure of the receiver 22. Locking pins 88 and 90 are mounted within bearings 91 that are disposed in the slots 92. Locking pins 88 and 90 are designed to move between retracted and locked or extended positions. In the locked position, locking pins 88 and 90 project from the respective slots 92 such that their outer terminal ends lie in the open area formed by the open areas 80 and 84. The outer ends of the pins 88 and 90 are slightly tapered, as shown in FIGS. 6A and 6B. The tapered ends of the locking pins 88 and 90 are designed to cooperate with the rounded terminal end portion of the head 24A. Springs 94 are disposed in the slots 92 and engage the opposite ends of the locking pins 88 and 90 so as to bias the locking pins inwardly towards the extended or locked position. As will be discussed below, when the coupler 24 in FIG. 6A is inserted into the receiver 22, the rounded head 24A of the coupler will engage the tapered ends of the locking pins 88 and 90. After engagement, and as the coupler 24 is further inserted into the receiver 22, the head 24A will bias the locking pins 24 outwardly towards the retracted or unlocked position. As the coupler 24 is continued to be inserted within the conical openings 80 and 84, as viewed in FIGS. 6C and 6D, the tapered ends of the locking pins 88 and 90 will slide along the surface of the head 24A. Even as the tapered ends slide along the surface of the head 24A, the springs 94 will continue to bias the locking pins 88 and 90 inwardly towards a locked position. At some point in the insertion process, the locking pins 88 and 90 will align with the transverse pin opening 24E in the coupler 24. Once this alignment occurs, the springs 94 will bias the locking pins 88 and 90 into the pin opening 24E. In this position the locking pins assume the locked position and the coupler 24 is securely locked within the receiver 22.

To automatically actuate the locking pins 88 and 90, the receiver 22 can be provided with a solenoid unit 96. Solenoid unit 96 enables locking pins 88 and 90 to be automatically actuated. More particularly, in the case of the designs shown in FIGS. 6A through 8D the solenoid unit 96 functions to automatically retract the locking pins 88 and 90, or other locking members, in response to the pressing of the solenoid actuator button 96A that is disposed on the housing 50 (FIG. 1). Additionally, solenoid unit 96 would include a manual override that would enable an operator to manually move the locking pins 88 and 90 from the locked position to an unlocked position. Further, the manual override would preferably be provided with a locking mechanism that would enable an operator to effectively disable the solenoid unit 96. Disabling the solenoid unit 96 would assure that the solenoid unit would not be accidentally or inadvertently actuated, for example, from a remote control device that is capable of operating the boat-loading device of the present invention. Details of the solenoid unit 96 and the manner of operatively connecting the same to the locking pins 88 and 90 are not disclosed herein in detail because such is not per se material to the present invention, and further, those skilled in the art will understand and appreciate that a solenoid device can be operatively connected to the locking pins 88 and 90 in various ways. For example, in certain cases the solenoid unit 96 can be connected to the individual locking pins 88 and 90 through a series of connectors, pivot pins, and lever arms.

Figure 7A:
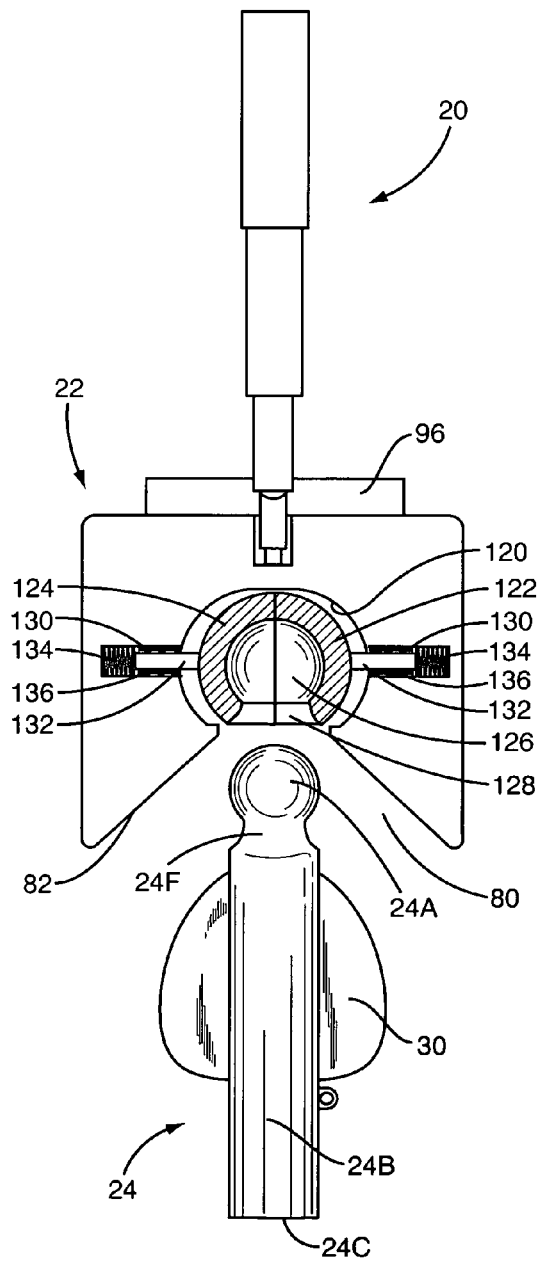
FIGS. 7A-7D are a sequence of views showing a second embodiment of the boat loading system of the present invention.

The second embodiment for the coupler 24 is shown in FIGS. 7A-7D. In this embodiment, the design of the insert member is somewhat different from that shown in FIGS. 6A-6D. In this case the head 24A assumes a rounded or ball shape, similar to a ball that forms a part of a conventional trailer hitch assembly. Adjacent the ball shaped head 24A is a neck 24F that is smaller in diameter than the head 24A. As seen in FIG. 7A for example, neck 24F lies between head 24A and the main body 24B.

Turning to the receiver shown in FIGS. 7A-7D, the outer housing structure is similar to the design shown in FIGS. 6A-6D. That is, the housing structure includes an outer cavity 80 having an outer wall 82. The inner cavity tends to be elongated or oval shaped and includes a surrounding wall 120. Disposed within the inner cavity defined by wall 120 is a pair of sections 122 and 124. Sections 122 and 124 are movably mounted in the inner cavity for movement between locked and unlocked positions. The two sections 122 and 124 form a round outer surface and together the two sections form an inner pocket 126. Inner pocket 126 is shaped to receive and lock around head 24A of the coupler 24. In FIG. 7A, the two sections 122 and 124 are disposed in the locked or extended position. In this position, the two sections 122 and 124 define an opening 128. Opening 128 is designed to receive the head 24A of the coupler 24.

The two sections 122 and 124 include arms 132 that extend outwardly therefrom and which extend into a pair of slots 130 formed in the housing of the receiver 22. Arms 132 extend into and slide back and forth within bearings 136 secured within the slots 130. Springs 134 are provided in the slots 130 and engage arms 132 so as to bias the two sections 122 and 124 towards the extended or locked position.

Figure 7B:
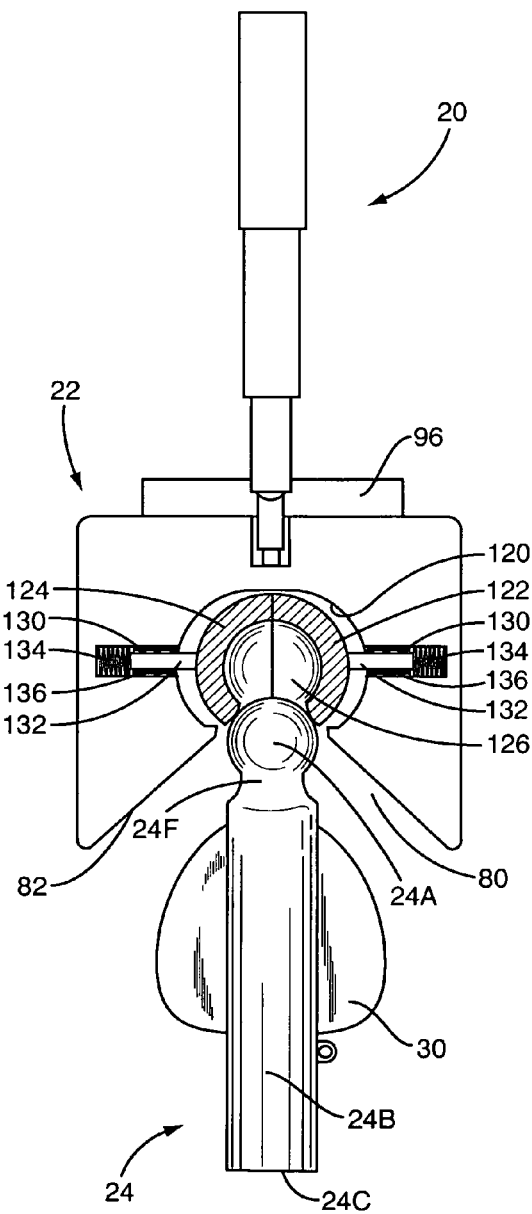
Figure 7C:
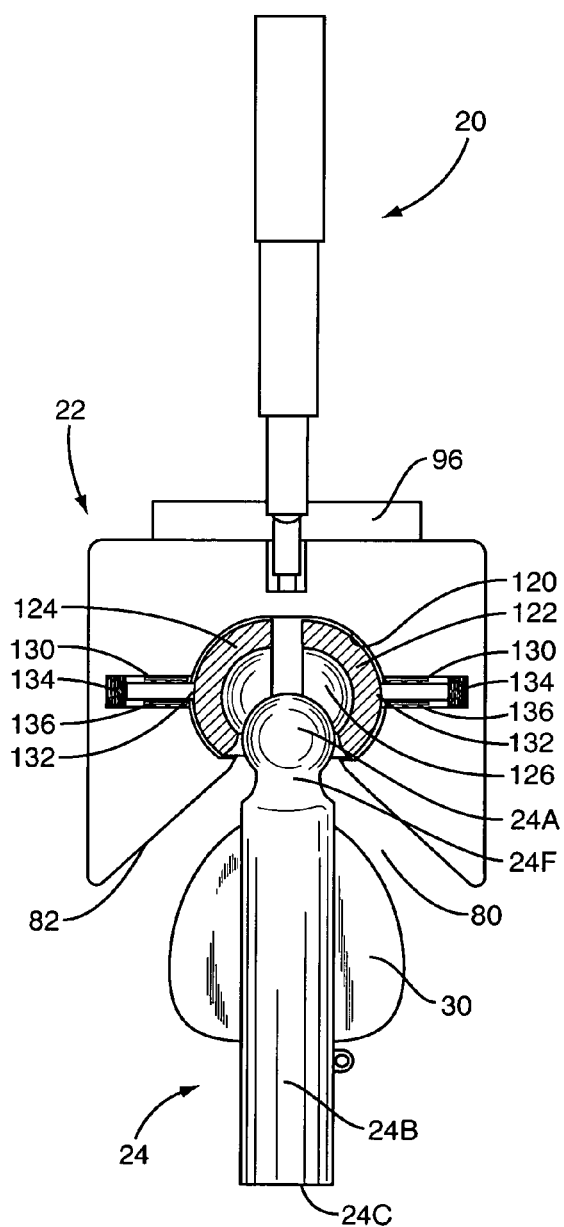
Figure 7D:
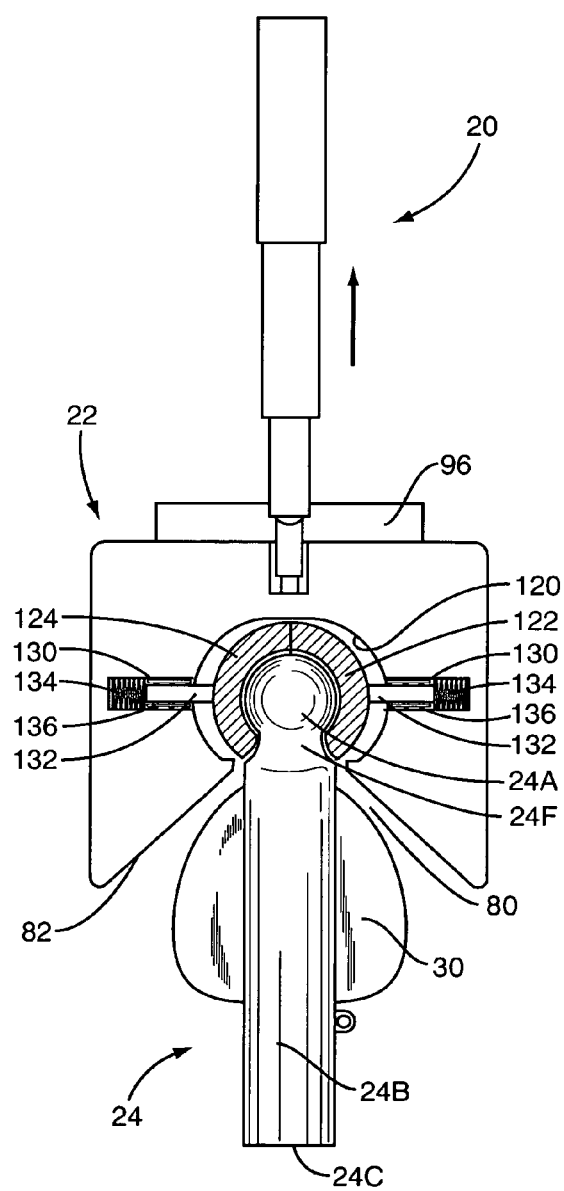
Figure 8A:
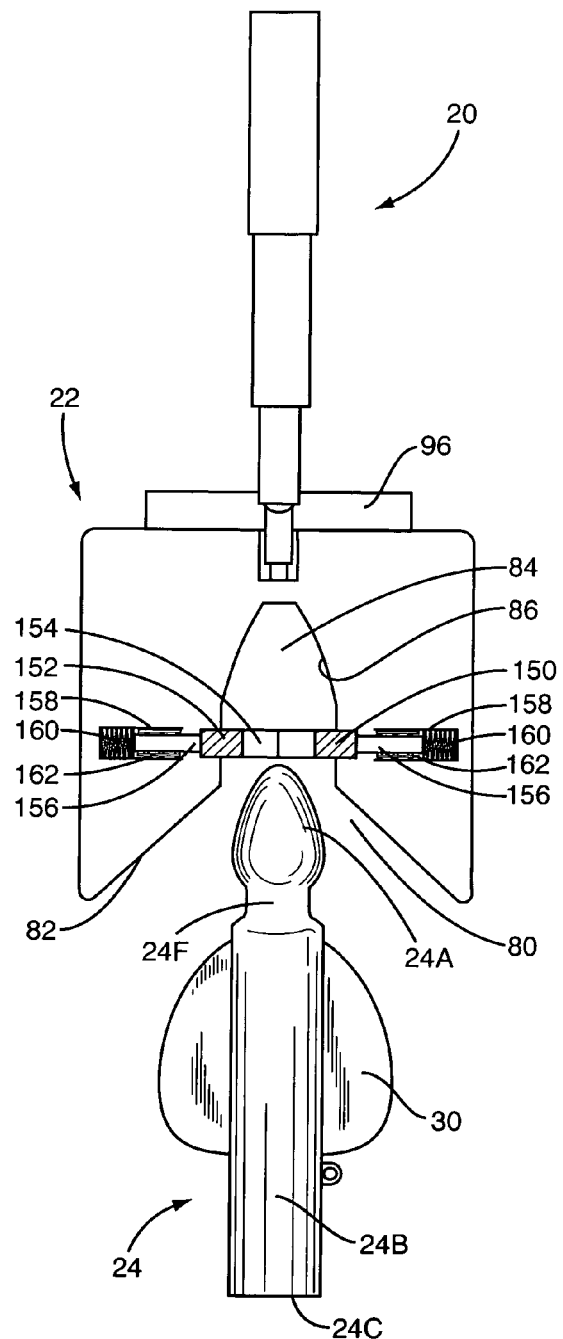
FIGS. 8A-8D are a sequence of views illustrating a third embodiment of the boat loading system of the present invention.
Figure 8B:
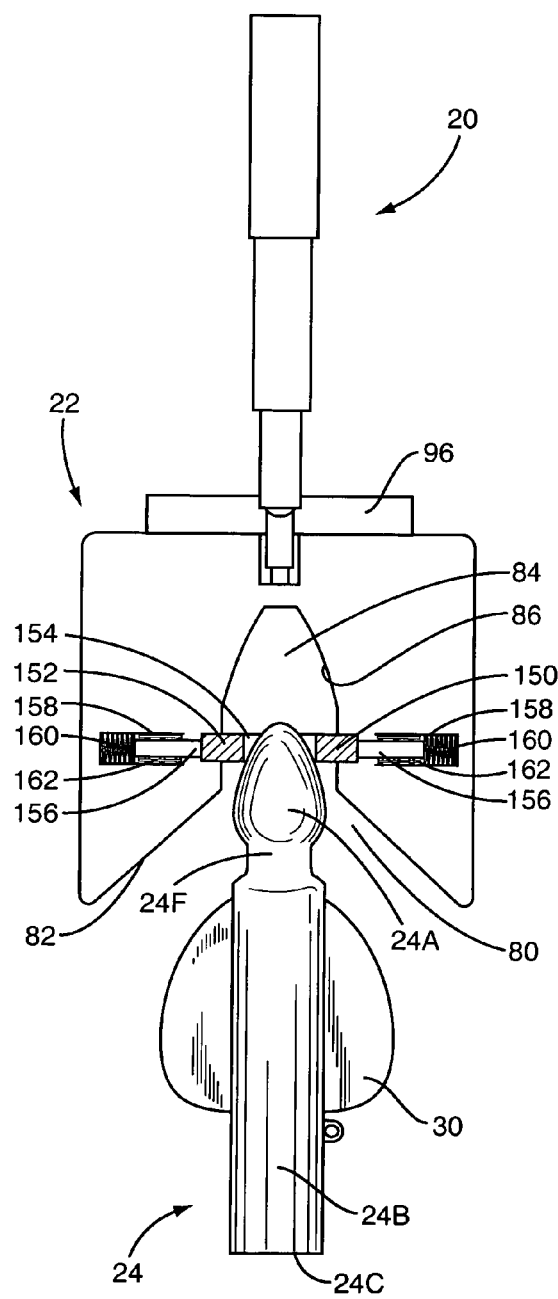
Figure 8C:
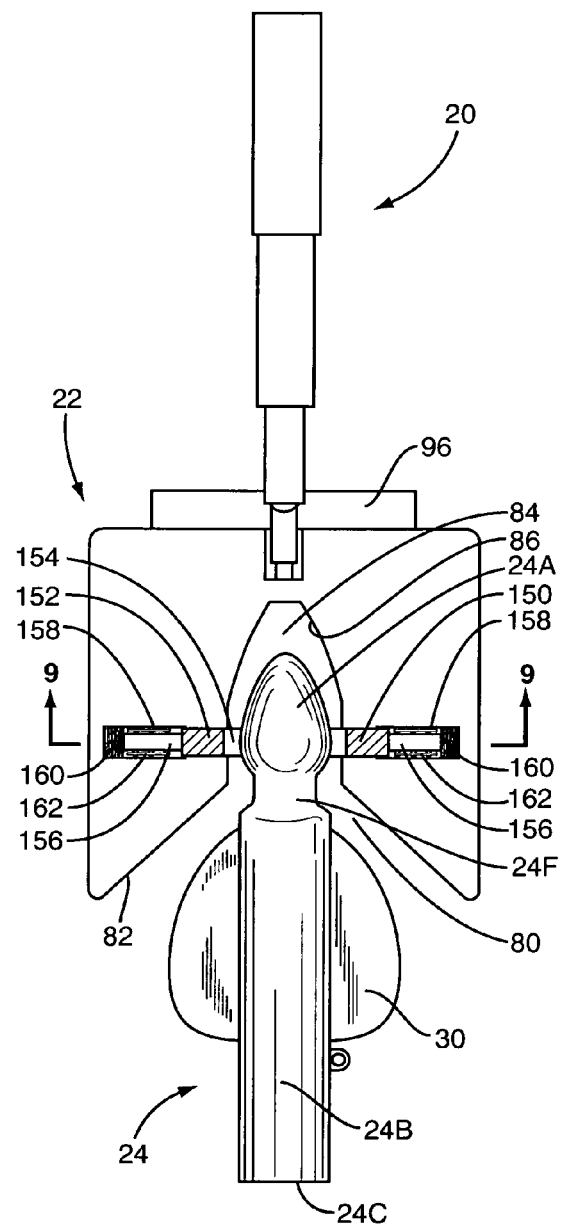
Figure 8D:
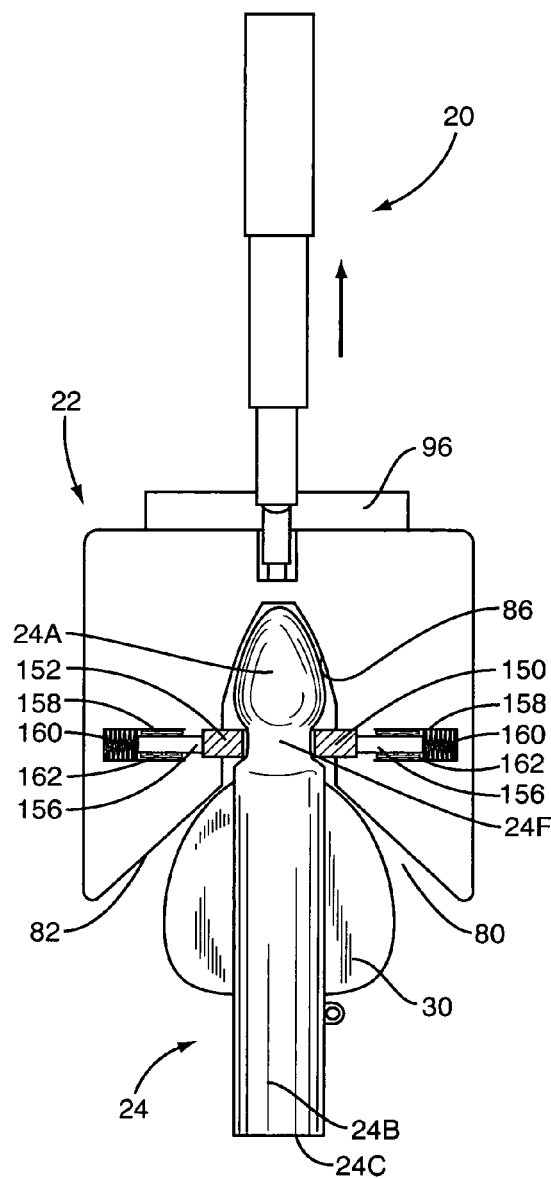

To couple the receiver 22 and coupler 24 according to the embodiment shown in FIGS. 7A-7D, the head 24A is positioned adjacent the opening 128, as shown in FIG. 7B. As the coupler 24 is pushed towards the inner cavity wall 120 the head 24A causes the two sections 122 and 124 to separate. See FIG. 7C. As the two sections 122 and 124 separate, the head 24A is permitted to enter the inner pocket 126 formed by the two sections 122 and 124. Once the head 24A seats within the pocket 126 portions of the two sections 122 and 124 extend around the head 24A and lock around the neck 24F of the coupler 24. See FIG. 7D. Springs 134 apply a continuous biasing action on the two sections 122 and 124 and cause the two sections to lock around the head 24A. Because the two sections 122 and 124, when in the locked position shown in FIG. 7D, extend around the neck 24F, the head 24A is locked within the pocket 126. Because of the biasing action of the springs 134, the head 24A is precluded from being inadvertently or easily pulled from the locking action of the two sections 122 and 124.

As with the embodiment disclosed in FIGS. 6A-6D, the receiver 22 of this embodiment would be provided with a solenoid unit 96, having a manual override, to disengage or unlock the two sections 122 and 124 from the coupler 24.

Figure 9:
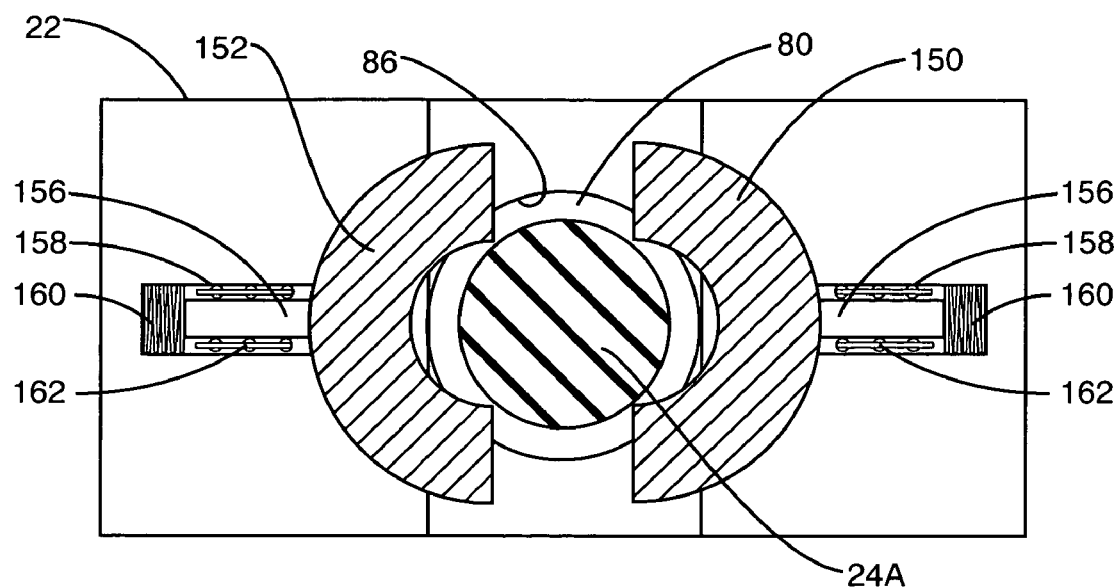
FIG. 9 is a cross sectional view through the line 9-9 of FIG. 8C.

Turning to the third embodiment for the receiver 22, the same is shown in FIGS. 8A-8D. In this embodiment, the housing structure of the receiver 22 is very similar to the receiver shown in FIGS. 6A-6D. However in this case, the locking mechanism of the receiver includes two movable sections 150 and 152. As shown in FIG. 9, these two movable sections 150 and 152 include two generally C-shaped or semi-circular members that define an opening 154 therein when they assume a closed or locked position. Extending outwardly from each section 150 or 152 is an arm 156. Each arm 156 is retained within a bearing 162 that is secured within a slot 158. Like other embodiments, the two C-shaped sections 150 and 152 are biased towards an extended or locked position by springs 160, which are retained in the slots 158 or otherwise operatively associated with the two movable sections 150 and 152.

In operation, the two C-shaped movable sections 150 and 152 assume a normal closed or locked position. This is due to the springs 160 biasing the sections 150 and 152 towards a closed position. As the head 24A enters opening 154 and engages the two movable sections 150 and 152, the movable sections are parted or moved outwardly as the coupler 24 is pushed into the inner cavity 84. As the head 24A moves through the opening 154 it is appreciated that the internal surface area that defines the opening 154 will slide against a head 24A. This will cause the sections 150 and 152 to move at least slightly outwardly against the force of the springs 160. At some point, the opening 154 will clear the head 24A and thereafter will close around the neck 24F of the coupler 24. This, because of the biasing action of the springs 160, will result in the coupler 24 being locked within the receiver 22.

As with the other embodiments, the receiver 22 would be provided with an electrically actuated solenoid unit 96. This would permit the receiver to be automatically disengaged or unlocked from the coupler 24. In all cases, it is preferable that the solenoid unit 96 be provided with a conventional manual override.

From the foregoing discussions, it is appreciated that the present invention provides for a relatively simple and efficient boat loading system or device that will automatically retrieve and pull a boat onto a transport position onto a boat trailer. Further, the same system can be utilized to launch a boat from the boat trailer. A remote control unit would typically be provided for controlling the boat loading system of the present invention. In particular, the remote control unit could perform numerous functions such as extending and retracting the extendable shaft 20 and actuating the solenoid unit 96.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A boat loading device for loading a boat onto a trailer, comprising:
   a. a receiver carried by the trailer or the boat;
   b. a coupler carried by the boat or the trailer;
   c. a powered extendable shaft for moving the coupler or the receiver into engagement with the other and for securing the coupler to the receiver;
   d. the extendable shaft being movable between retracted and extended positions;
   e. the powered extendable shaft being connected to the receiver or the coupler and movable between the extended and retracted positions;
   f. wherein when secured to the boat and the boat trailer and the receiver and coupler are connected, the boat loading device extends between a portion of the trailer and a portion of the boat; and
   g. wherein the boat-loading device is operative to pull the boat onto the boat trailer in response to the extendable shaft moving from the extended position to the retracted position.

2. The boat loading device of claim 1 wherein the receiver includes a tapered opening and wherein the coupler includes an insert that fits into the receiver.

3. The boat loading device of claim 1 wherein the receiver or coupler includes one or more locking pins movable between retracted and extended positions such that when the one or more locking pins assume the extended position, the one or more locking pins secure the coupler to the receiver.

4. The boat loading device of claim 1 wherein the coupler or receiver comprises an elongated member having a tapered head and one or more guide wings projecting outwardly therefrom.

5. The boat loading device of claim 4 wherein the elongated member includes at least one pin opening and wherein either the coupler or receiver includes one or more locking pins movable back and forth between retracted and locked positions such that when the one or more locking pins are inserted into the pin opening in the elongated member, the coupler and receiver are secured together.

6. The boat loading device of claim 1 wherein the coupler comprises an insert member that is adapted to be inserted into the receiver, and wherein the receiver includes a locking assembly for locking to the insert member, the locking assembly including at least two locking members that are independently movable and which move between locked and unlocked positions; in the unlocked position each locking member defines an opening through which the insert member may be inserted, and in the locked position the locking members extend around at least a portion of the insert member; and wherein the locking members are spring biased towards either the unlocked position or thelocked position.

7. The boat loading device of claim 6 wherein the locking members define the opening and extend substantially around the defined opening, and wherein the locking members are spring biased towards the locked position, but are yieldable in response to the insert member being inserted into the opening.

8. The boat-loading device of claim 6 including one or more springs for engaging and biasing the locking members.

9. The boat loading device of claim 6 including at least one solenoid operatively associated with the receiver for moving the locking members to a locked or unlocked position.

10. The boat-loading device of claim 1 wherein the extendable shaft is movable about at least one axis.

11. The boat-loading device of claim 1 wherein the powered extendable shaft comprises a telescoping shaft.

12. A boat trailer comprising the boat-loading device of claim 1 wherein the extendable shaft is carried by the boat trailer and wherein the receiver or coupler is mounted to the extendable shaft with the other one of the receiver or coupler being adapted to be mounted to a boat.

* * * * *